(No Model.) 2 Sheets—Sheet 1.

R. S. WARING.
MANDREL FOR CABLE PRESSES.

No. 294,550. Patented Mar. 4, 1884.

WITNESSES:
Darwin S. Wolcott
R. H. Whitney

INVENTOR
Richard S. Waring
by George H. Christy
ATTORNEY (No Model.)

R. S. WARING.
MANDREL FOR CABLE PRESSES.

No. 294,550. Patented Mar. 4, 1884.

WITNESSES:
Darwin S. Wolcott
R. H. Whitney

INVENTOR
Richard S. Waring.
by George H. Christy
ATTORNEY

UNITED STATES PATENT OFFICE.

RICHARD S. WARING, OF PITTSBURG, PENNSYLVANIA.

MANDREL FOR CABLE-PRESSES.

SPECIFICATION forming part of Letters Patent No. 294,550, dated March 4, 1884.

Application filed October 24, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Mandrels for Cable-Presses; and I do hereby declare the following to be a full, clear, concise, and exact description thereof, reference being had to the accompanying drawings, making a part of this specification, in which—like letters indicating like parts—

Figure 1:
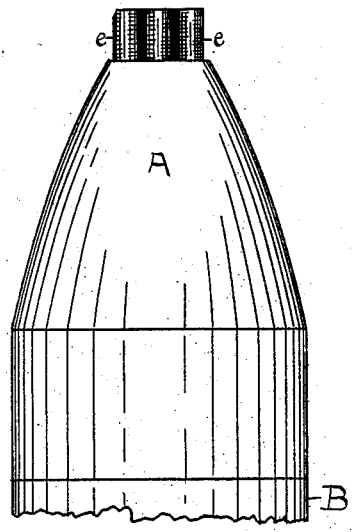
Figure 2:
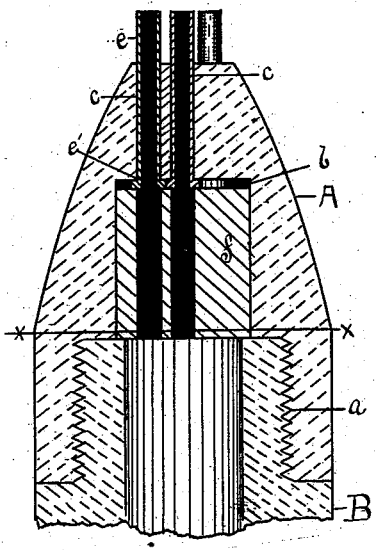
Figure 3:
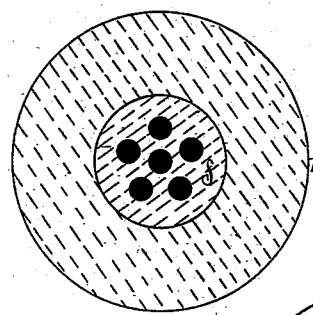
Figure 4:
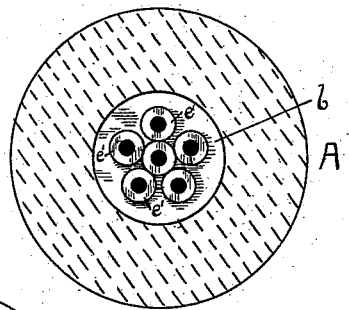
Figure 7:
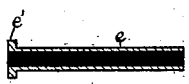
Figure 6:
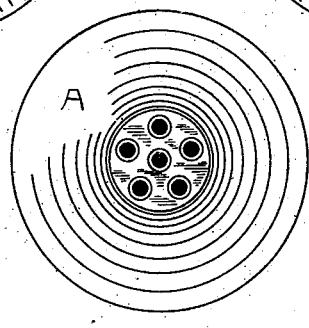
Figure 8:
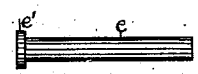
Figure 10:
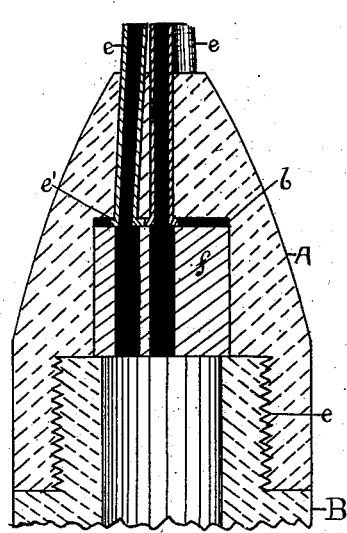
Figures 9, 11:
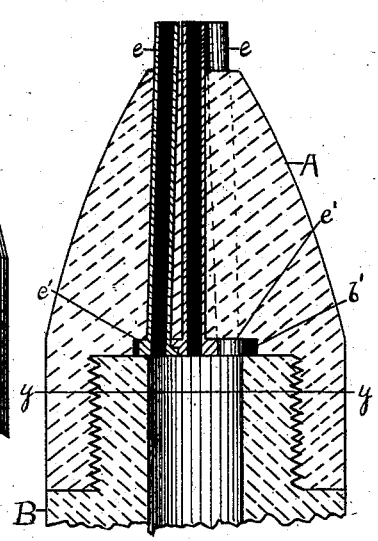
Figure 15:
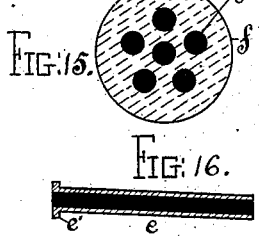
Figures 12, 13:
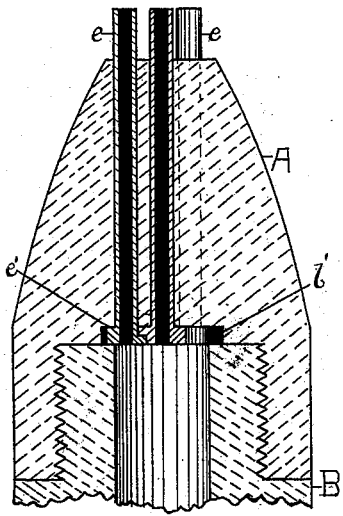
Figure 14:
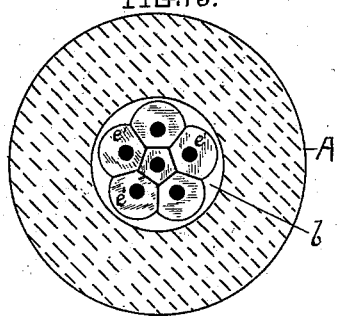

Figure 1 is a side elevation of my improved mandrel. Fig. 2, Sheet 1, is a longitudinal central section of the same. Fig. 3, Sheet 1, is a transverse section on the line $x\,x$, Fig. 2. Fig. 4, Sheet 1, is a section similar to Fig. 3, but with the central plug removed. Fig. 5, Sheet 1, is a top plan view. Fig. 6, Sheet 1, is a top plan view of the perforated plug or cylinder. Figs. 7 and 8, Sheet 1, are sectional and side elevations of the removable nipples. Fig. 9, Sheet 2, is a side elevation of my improved mandrel, showing the outer row of nipples inclined toward the central nipple. Fig. 10, Sheet 2, is a longitudinal central section of Fig. 9. Fig. 11, Sheet 2, is a view similar to Fig. 9, but showing a modification of the manner of retaining the nipples. Fig. 12, Sheet 2, is a transverse section on the line $y\,y$, Fig. 11. Fig. 13, Sheet 2, is a longitudinal central section, showing the nipples arranged parallel and retained in place in the same manner as in Fig. 11. Fig. 14, Sheet 2, is a transverse section, showing the manner of interlocking the flanges of the nipples. Fig. 15, Sheet 2, is a transverse sectional view of the perforated plug or cylinder. Figs. 16 to 19, Sheet 2, are detail views of the nipples.

My invention relates to that class of mandrels used in lead-presses for making lead-covered cables, said mandrels being provided with passages therethrough for the electric conductors, the passages terminating in nipples at the end of the mandrel.

In former applications I have shown mandrels in which the nipples were formed integral with the body of the mandrel; but I have found by experience that it is not only difficult and expensive to make these mandrels, but that these nipples are liable to be broken off or damaged while in use, and that in case of the breakage or damage of one of these nipples, which are formed integral with the mandrel, the entire mandrel is rendered useless; and it frequently happens that the wire-passages through the mandrel become enlarged by the abrasion of the wires passing through them, and will then allow kinks or bends in the wire to pass through them; and as the wires in the completed cable are arranged in close proximity to each other, the kink or bend in one of the wires might come in contact with another wire, and thereby prevent the formation of an intact wall of lead between the wires. Consequently, whenever any of the wire-passages become much enlarged, the whole mandrel has to be thrown away.

The object of my invention is to produce a mandrel which is not only more easily made and less expensive, but can also be easily repaired in case of the destruction of one or more of the nipples or the enlargement of the wire-passages; and, in general terms, my invention consists in the construction and combination of parts, all as more fully hereinafter described and claimed.

A is a tapering mandrel, of steel or other suitable metal, having a screw-threaded socket, $a$, at its lower end for attachment to the core-bar B of the lead-press.

Above the socket $a$ is formed another socket, $b$, which is somewhat larger in diameter than the opening in the core-bar B. From this socket $b$ extend two, three, or more small passages, $c$, through the upper end of the mandrel A. Through these passages $c$ are inserted steel or other suitable metal tubes, $e$, which are provided with flanges $e'$ at their inner ends, and are of length sufficient to entirely line the passages $c$ and to protrude a short distance beyond the end of the mandrel. These tubes $e$ are held in place by means of a plug or cylinder, $f$, provided with longitudinal perforations $f'$, each showing a diameter at least equal to the diameter of the openings in the tubes $e$, but should be less than the outside diameter of the flanges $e'$. After the tubes $e$ are inserted in the passages $c$ and their flanges $e'$ have been firmly pressed up against the top of the socket $b$, the perforated plug or cylinder $f$ is placed in the socket, with its perforations registering with the tubes $e$, and the edges of the perforations bearing against the flanges $e'$. Then the mandrel, with its parts adjusted as above stated, is screwed onto the core-bar B, and as the diameter of the opening in the core-bar B is less than the diameter of the plug or cylinder $f$, the inner peripheral edge of the core-bar will bear upon the outer peripheral edge of the plug, thereby holding the plug firmly in place, and this plug in turn holds the tubes $e$ in place.

It is obvious that in case the ends of any of the tubes or nipples of a mandrel constructed as above described should become broken or damaged said nipple or tube can be easily replaced.

Figure 16:
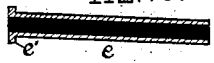

In case it is desirable to form a cable of smaller diameter and with thinner walls between the electric conductors, the outer row of passages can be made so as to incline from their inner ends toward the central passages, as clearly shown in Figs. 9, 10, and 11, Sheet 2, and the flanges $e'$ of the tubes $e$ should in such case be formed at an angle to the tubes, as shown in Fig. 16, Sheet 2.

It is frequently desirable that there be no openings or spaces between the flanges $e'$ of the tubes $e$ when arranged in their places in the mandrel. In such case I construct the flanges $e'$, as shown in Fig. 14, Sheet 2, so that their meeting edges shall abut and match, forming what is practically a smooth, unbroken surface at the end of the socket $b$.

The construction of my mandrel may be so further modified that the tubes $e$ may be held in place by the end of the core-bar without the interposition of the perforated plug or cylinder $f$. This may be effected by making the extreme end of the core-bar solid, and then forming perforations in said solid end, the perforations being so arranged as to register with the tubes $e$ when the mandrel is screwed onto the core-bar; but I prefer to attain the same end—i. e., omitting the perforated plug or cylinder—in the following manner: The core-bar is constructed as usual, and the mandrel is provided with its usual threaded socket, $a$, and a shorter socket or recess, $b'$, having a depth only equal to the thickness of the flanges $e'$, into which socket the passages $c$ open, as in the other construction described. The tubes $e$ are provided with flanges $e'$, as before; but the flanges in this case are made thicker, the outer row of tubes $e$ are held in place by the inner periphery of the core-bar, and the central tube $e$ is held in place by the flanges of the outer row of tubes, said flanges lapping over the flange of the inner tube for that purpose, as shown in Figs. 11, 12, 13, and 14.

Figure 17:
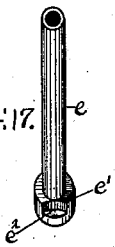
Figures 18, 19:
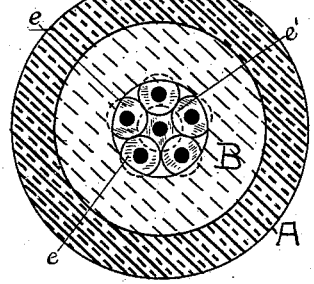

In order that the flanges of the outer row of tubes may bear upon the end of the socket $b'$, they are cut away in one place on their inner surface, as shown at $e^2$, Fig. 17, for half their thickness, and the outer surface of the flange of the central tube is scalloped or circularly recessed around its entire periphery for half its thickness, as shown at $e^3$, Fig. 19.

The tubes, having flanges as just described, may be arranged parallel to each other, as shown in Fig. 13, or the outer row may be inclined toward the central tube, as shown in Fig. 11.

I claim herein as my invention—

1. In a mandrel for lead-presses, the combination of the body A, having longitudinal openings therethrough, the removable nipples $e$, forming the passages and the protruding nipples for the wires, and mechanisms described for holding the nipples in place, substantially as set forth.

2. In a mandrel for lead-presses, the combination of the body A, having longitudinal openings therethrough, the removable nipples $e$, provided with a flange at one end thereof, the perforated plug $f$, and the core-bar, substantially as set forth.

3. In a mandrel for lead-presses, the combination of the body A, having openings therethrough, the removable nipples $e$, forming passages for the wires, and having interlocking flanges, as described, the perforated plug $f$, and the core-bar, substantially as set forth.

4. In a mandrel for lead-presses, the combination of the body A, having a series of openings therethrough, arranged as described, the removable nipples $e$, having flanges at one end, the flange of the central nipple having recesses formed in its outer side at intervals around its circumference, the flanges of the outer nipples having a recess formed in their inner sides at one point of their circumference, whereby the central nipple is supported by the outer nipples, and mechanism, as described, for holding the outer nipples in place, substantially as set forth.

5. In a mandrel for lead-presses, the combination of the body A, having a series of openings arranged around and inclined toward a central opening, the removable nipples $e$, having flanges $e'$, the perforated plug $f$, and the core-bar, substantially as shown and described.

In testimony whereof I have hereunto set my hand.

RICHARD S. WARING.

Witnesses:
DARWIN S. WOLCOTT,
R. H. WHITTLESEY.